US012335289B2

United States Patent
Ping et al.

(10) Patent No.: US 12,335,289 B2
(45) Date of Patent: Jun. 17, 2025

(54) ADAPTIVE MUTUAL TRUST MODEL FOR DYNAMIC AND DIVERSITY MULTI-DOMAIN NETWORK

(71) Applicant: Nokia Technologies Oy, Espoo (FI)

(72) Inventors: Jing Ping, Chengdu (CN); Anatoly Andrianov, Schaumburg, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 372 days.

(21) Appl. No.: 17/766,424

(22) PCT Filed: Oct. 7, 2019

(86) PCT No.: PCT/CN2019/109850
§ 371 (c)(1),
(2) Date: Apr. 4, 2022

(87) PCT Pub. No.: WO2021/068096
PCT Pub. Date: Apr. 15, 2021

(65) Prior Publication Data
US 2023/0128998 A1   Apr. 27, 2023

(51) Int. Cl.
*H04L 9/40*   (2022.01)
(52) U.S. Cl.
CPC .............................. *H04L 63/1433* (2013.01)
(58) Field of Classification Search
CPC ..... H04L 63/1433; H04L 67/30; H04W 12/08
See application file for complete search history.

(56) References Cited

U.S. PATENT DOCUMENTS

| 9,130,921 B2 | 9/2015 | Boubez et al. |
| 11,134,074 B1* | 9/2021 | Tandri ................. H04L 63/0823 |

(Continued)

FOREIGN PATENT DOCUMENTS

| CN | 101753565 A | 6/2010 |
| CN | 105871880 A | 8/2016 |

(Continued)

OTHER PUBLICATIONS

"3rd Generation Partnership Project; Technical Specification Group Services and System Aspects; Management and orchestration; Concepts, use cases and requirements (Release 15)", 3GPP TS 28.530, V15.1.0, Dec. 2018, pp. 1-28.

(Continued)

*Primary Examiner* — Sarah Su
(74) *Attorney, Agent, or Firm* — SQUIRE PATTON BOGGS (US) LLP

(57) ABSTRACT

An entity that creates an adaptive trust model, by a trust model adaptor of the apparatus, configured to establish a trust relationship with an other apparatus according to a composition of trust of the other apparatus derived from a trust evaluator of the other apparatus and a composition of trust of the apparatus derived from a trust evaluator of the apparatus. The entity authenticates the other apparatus based on the adaptive trust model and policies defined in the adaptive trust model; defines access control rules for the other apparatus based on the adaptive trust model and the policies defined in the adaptive trust model; builds a secure channel with the other apparatus based on the adaptive trust model and policies defined in the adaptive trust model; and records behaviors of the other apparatus on the apparatus.

20 Claims, 7 Drawing Sheets

(56) References Cited

U.S. PATENT DOCUMENTS

| | | |
|---|---|---|
| 2005/0097319 A1 | 5/2005 | Zhu et al. |
| 2009/0049514 A1 | 2/2009 | Yan et al. |
| 2010/0058457 A1* | 3/2010 | Ormazabal ......... H04L 43/0852 |
| | | 709/224 |
| 2013/0145419 A1 | 6/2013 | Hu |
| 2015/0128264 A1* | 5/2015 | White, Jr. ............... H04L 67/30 |
| | | 709/224 |
| 2017/0078875 A1* | 3/2017 | Muhanna ............. H04L 9/0827 |
| 2017/0171158 A1* | 6/2017 | Hoy ..................... H04L 63/1408 |
| 2018/0115520 A1* | 4/2018 | Neuman ............. H04L 63/0272 |
| 2018/0367573 A1* | 12/2018 | Ouyang ................ H04W 12/08 |
| 2022/0377092 A1* | 11/2022 | Vigna .................. G06Q 50/265 |
| 2023/0021216 A1* | 1/2023 | Shilawat ............. H04L 63/1433 |
| 2023/0030124 A1* | 2/2023 | Hearty ................. H04L 63/105 |
| 2023/0239325 A1* | 7/2023 | Keiser, Jr. ........... H04L 63/1416 |
| | | 726/1 |

FOREIGN PATENT DOCUMENTS

| | | | | |
|---|---|---|---|---|
| CN | 107317801 A | * | 11/2017 | |
| CN | 114125728 A | * | 3/2022 | ......... H04B 7/18506 |
| CN | 114401134 A | * | 4/2022 | |
| CN | 114503632 A | * | 5/2022 | ......... H04L 63/1433 |
| CN | 114513517 A | * | 5/2022 | ....... G06F 18/24155 |
| CN | 117580049 A | * | 2/2024 | |
| CN | 118922817 A | * | 11/2024 | ............. G06F 21/33 |
| EP | 0409397 B1 | | 9/1996 | |
| EP | 1681832 A1 | * | 7/2006 | ............. H04L 29/08 |
| EP | 1721235 B1 | * | 8/2007 | ........... H04L 12/185 |
| EP | 1867190 B1 | * | 8/2009 | ......... H04L 29/0602 |
| WO | WO-2012095860 A2 | * | 7/2012 | ........... H04L 63/105 |

OTHER PUBLICATIONS

"Zero-touch network and Service Management (ZSM); Reference Architecture", ETSI GS ZSM 002, V1.1.1, Aug. 2019, pp. 1-80.

"Information Security", National Institute of Standards and Technology, NIST SP 800-39, Mar. 2011, 88 Pages.

International Search Report and Written Opinion received for corresponding Patent Cooperation Treaty Application No. PCT/CN2019/109850, dated Jul. 20, 2020, 11 pages.

"3G-WLAN—Trust Model", 3GPP TSG SA WG3 Security—S3#25, S3-020523, Ericsson, Oct. 8-11, 2002, 2 Pages.

"3rd Generation Partnership Project; Technical Specification Group Services and System Aspects; Security Aspects; Study on Security Impacts of Virtualisation (Release 16)", 3GPP TR 33.848, V0.1.0, May 2019, pp. 1-14.

Extended European Search Report received for corresponding European Patent Application No. 19948395.9, dated Jun. 13, 2023, 7 pages.

Chinese Office Action issued in corresponding Chinese Patent Application No. 2019801010872 on Aug. 23, 2024.

Chinese Office Action issued in corresponding Chinese Patent Application No. 20198010108722024.

European Office Action issued in corresponding European Patent Application No. 19948395.9-1206 on Mar. 28, 2025.

* cited by examiner

ADAPTIVE MUTUAL TRUST MODEL FOR DYNAMIC AND DIVERSITY MULTI-DOMAIN NETWORK

RELATED APPLICATION

This application was originally filed as PCT Application No. PCT/CN2019/109850, filed on Oct. 7, 2019, of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for implementing adaptive mutual trust models for dynamic and diversity multi-domain networks.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR provides bitrates on the order of 10-20 Gbit/s or higher, and can support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE radio access. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

In accordance with some embodiments, a method may include creating an adaptive trust model, by a trust model adaptor of an apparatus, configured to establish a trust relationship with an other apparatus according to a composition of trust derived by a trust evaluator of the other apparatus and a composition of trust derived by a trust evaluator of the apparatus. The method may further include applying security controls between the apparatus and the other apparatus.

In accordance with some embodiments, an apparatus may include at least one processor and at least one memory including computer program code. The at least one memory and the computer program code may be configured to, with the at least one processor, cause the apparatus to at least create an adaptive trust model, by a trust model adaptor of the apparatus, configured to establish a trust relationship with an other apparatus according to a composition of trust derived by a trust evaluator of the other apparatus and a composition of trust derived by a trust evaluator of the apparatus. The at least one memory and the computer program code may be further configured to, with the at least one processor, cause the apparatus to at least apply security controls between the apparatus and the other apparatus.

In accordance with some embodiments, an apparatus may include means for creating an adaptive trust model, by a trust model adaptor of an apparatus, configured to establish a trust relationship with another apparatus according to a composition of trust of the other apparatus and a composition of trust of the apparatus. The apparatus may further include means for applying security controls between the apparatus and the other apparatus.

In accordance with some embodiments, a non-transitory computer readable medium may be encoded with instructions that may, when executed in hardware, perform a method. The method may create an adaptive trust model, by a trust model adaptor of the apparatus, configured to establish a trust relationship with an other apparatus according to a composition of trust derived by a trust evaluator of the other apparatus and a composition of trust derived by a trust evaluator of the apparatus. The method may further apply security controls between the apparatus and the other apparatus.

In accordance with some embodiments, a method may include creating an adaptive trust model, by a trust model adaptor of an apparatus, configured to establish a trust relationship with an other apparatus according to a composition of trust derived by a trust evaluator of the other apparatus and a composition of trust derived by a trust evaluator of the apparatus. The method may further include applying security controls between the apparatus and the other apparatus. The method may further include receiving, from the other apparatus, an indication of a change on the other apparatus. The method may further include deriving a new trust model and establish a new trust relationship to reflect a new composition of trust based on the change.

In accordance with some embodiments, an apparatus may include at least one processor and at least one memory including computer program code. The at least one memory and the computer program code may be configured to, with the at least one processor, cause the apparatus to at least create an adaptive trust model, by a trust model adaptor of the apparatus, configured to establish a trust relationship with an other apparatus according to a composition of trust derived by a trust evaluator of the other apparatus and a composition of trust derived by a trust evaluator of the apparatus. The at least one memory and the computer program code may be further configured to, with the at least one processor, cause the apparatus to at least apply security controls between the apparatus and the other apparatus. The at least one memory and the computer program code may be further configured to, with the at least one processor, cause the apparatus to at least receive, from the other apparatus, an indication of a change on the other apparatus. The at least one memory and the computer program code may be further configured to, with the at least one processor, cause the apparatus to at least derive a new trust model and establish a new trust relationship to reflect a new composition of trust based on the change.

In accordance with some embodiments, an apparatus may include means for creating an adaptive trust model, by a trust model adaptor of an apparatus, configured to establish a trust relationship with an other apparatus according to a composition of trust derived by a trust evaluator of the other apparatus and a composition of trust derived by a trust evaluator of the apparatus. The apparatus may further include means for applying security controls between the apparatus and the other apparatus. The apparatus may further include means for receiving, from the other apparatus, an indication of a change on the other apparatus. The apparatus may further means for include deriving a new trust model and establish a new trust relationship to reflect a new composition of trust based on the change.

In accordance with some embodiments, a non-transitory computer readable medium may be encoded with instructions that may, when executed in hardware, perform a method. The method may create an adaptive trust model, by a trust model adaptor of the apparatus, configured to establish a trust relationship with an other apparatus according to a composition of trust derived by a trust evaluator of the other apparatus and a composition of trust derived by a trust evaluator of the apparatus. The method may further apply security controls between the apparatus and the other apparatus. The method may further receive, from the other apparatus, an indication of a change on the other apparatus. The method may further derive a new trust model and establish a new trust relationship to reflect a new composition of trust based on the change.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for implementing adaptive mutual trust models for dynamic and diversity multi-domain networks, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as merely illustrative of the principles and teachings of certain example embodiments, and not in limitation thereof.

Figure 1:
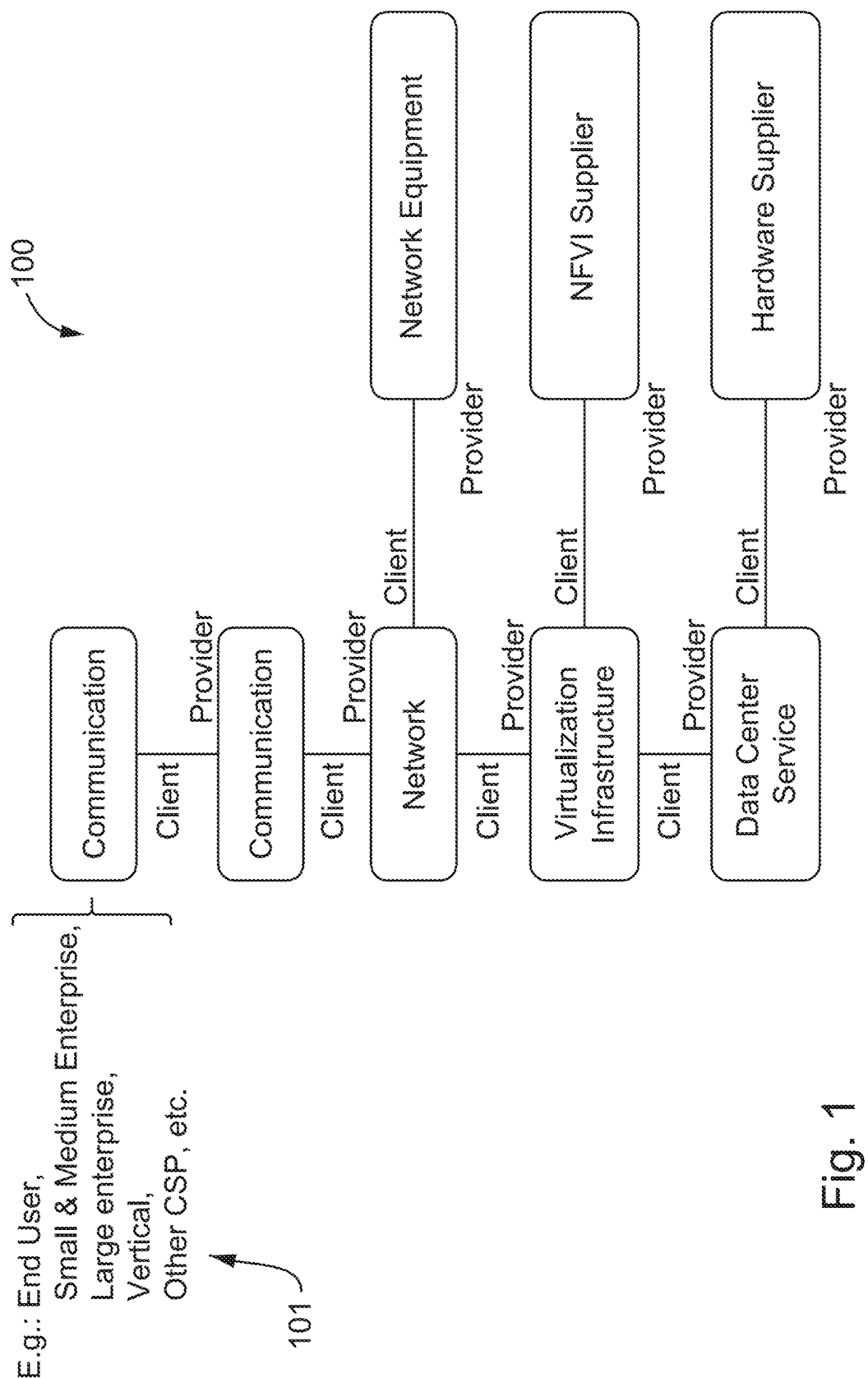
FIG. 1 illustrates an example network.

FIG. 1 shows an example 5G ecosystem 100 and its technological breakthroughs, such as Network Slicing, software-driven and service-based architecture, which allows new business models and value creation across multiple industry domains 101, including verticals, mobile network operators, infrastructure service providers, and application providers.

Figure 2:
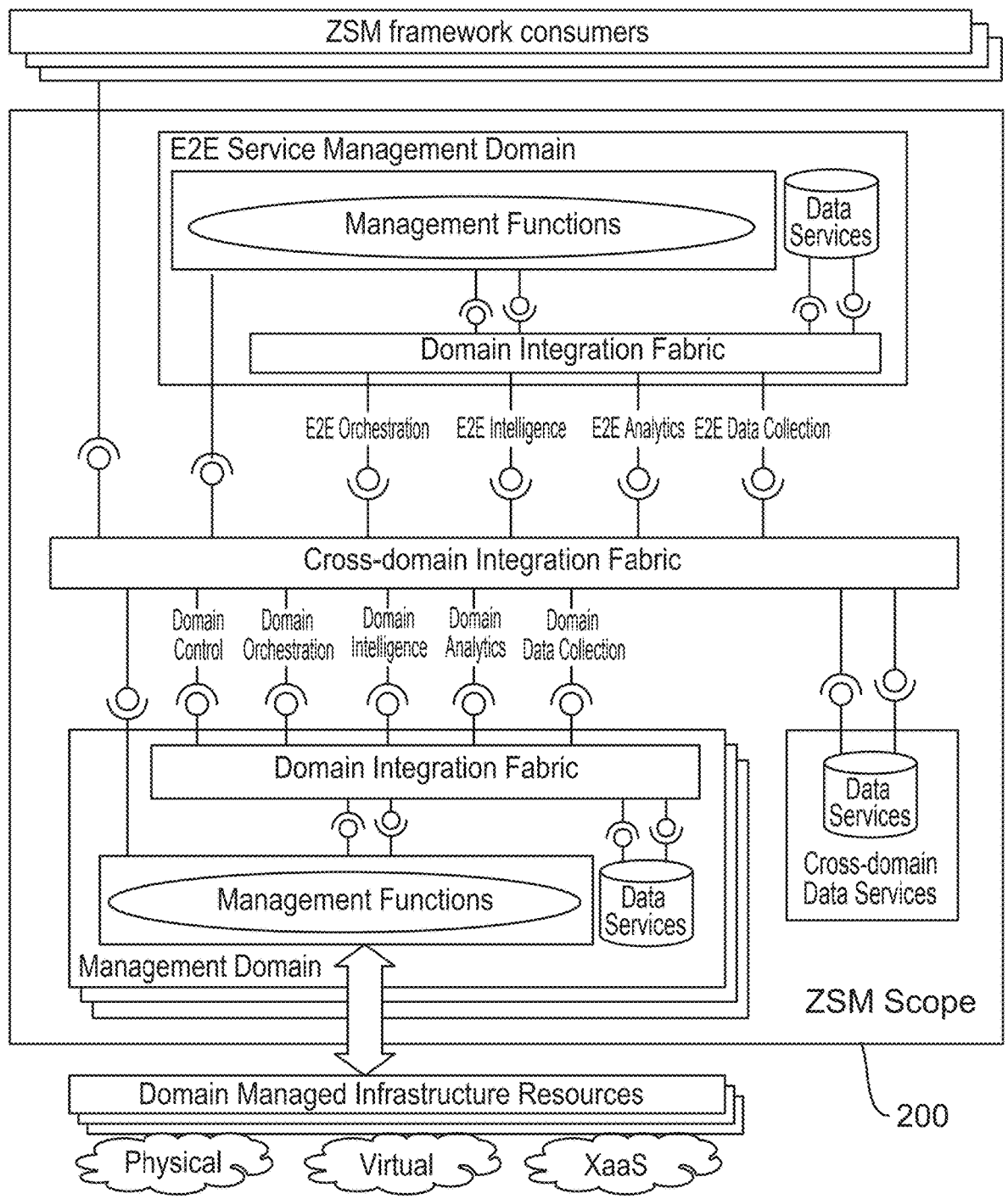
FIG. 2 illustrates an example zero-touch service and network management framework reference architecture.

The disruptive deployment of 5G network triggers the need for network transformation and radical change in the way networks and services are managed and orchestrated. FIG. 2 shows an example of a Zero-touch Service and Network Management (ZSM) 200, which is a full end-to-end automation of network and service management framework and solutions, that was designed to manage and orchestrate the future service and network including 5G network.

Mutual Trust should be established between entities inside a domain or inter different domains, before they interact with each other for service booking and consuming, as well as service, network management, and orchestration, to ensure confidentially, integrity, availability, and regulation compliance of each entity.

To build trust relationship between different entities, traditionally, there are several trust models defined to establish trust relationship between different entities that allow one entity to obtain the levels of trust needed to form partnerships, collaborate with other organizations, share information, or receive information/services. The conventional trust models were defined in NIST800-39 including validated trust, direct historical trust, mediated trust, mandated trust, and hybrid trust. Further, European Telecommunication Standard Institute (ETSI) Network Function Virtualization (NFV) decomposed transitive trust to several more granular models such as direct delegated trust, collaborative trust, transitive trust, and reputational trust. Those trust models can be applied to statically to various entities to build different levels of trust.

ETSI NFV introduced a concept of dynamics. However, it still focused on the relationship between VNF and serving virtual infrastructure, and always took virtual infrastructure components (e.g. TPM on HW), Management and Orchestration (MANO) entities, or Certificate Authorities (CA) as trust root to build static transitive/collaborative trust models for VNF or MANO entities. Therefore, NFV did not provide a solution to handle potential trust model transformation because of the dynamics of a NFV ecosystem.

FIG. 1 illustrates the openness of a 5G ecosystem 100 which involved players from multiple industry domains 101, like enterprise, finance, governments, web-scale, operator, and cloud provider. The trust levels required by different domains vary, and the trust levels of the same domain in different context can also be different. In addition, a cloud native service-based architecture is adopted by ZSM to facilitate fast deployment and update of the service to satisfy the diversity requirements from various vertical customers. The trust context and relationship between management functions of same domain or different domains could change dynamically along with the change of the management function itself, its consumer or its producer.

The dynamics and diversity of the 5G network and ZSM framework, cause the existing trust models, either single trust model or a combination of multiple trust models, to be inadequate to ensure confidentiality, integrity, and availability of the 5G network and ZSM services and data.

Figure 3:
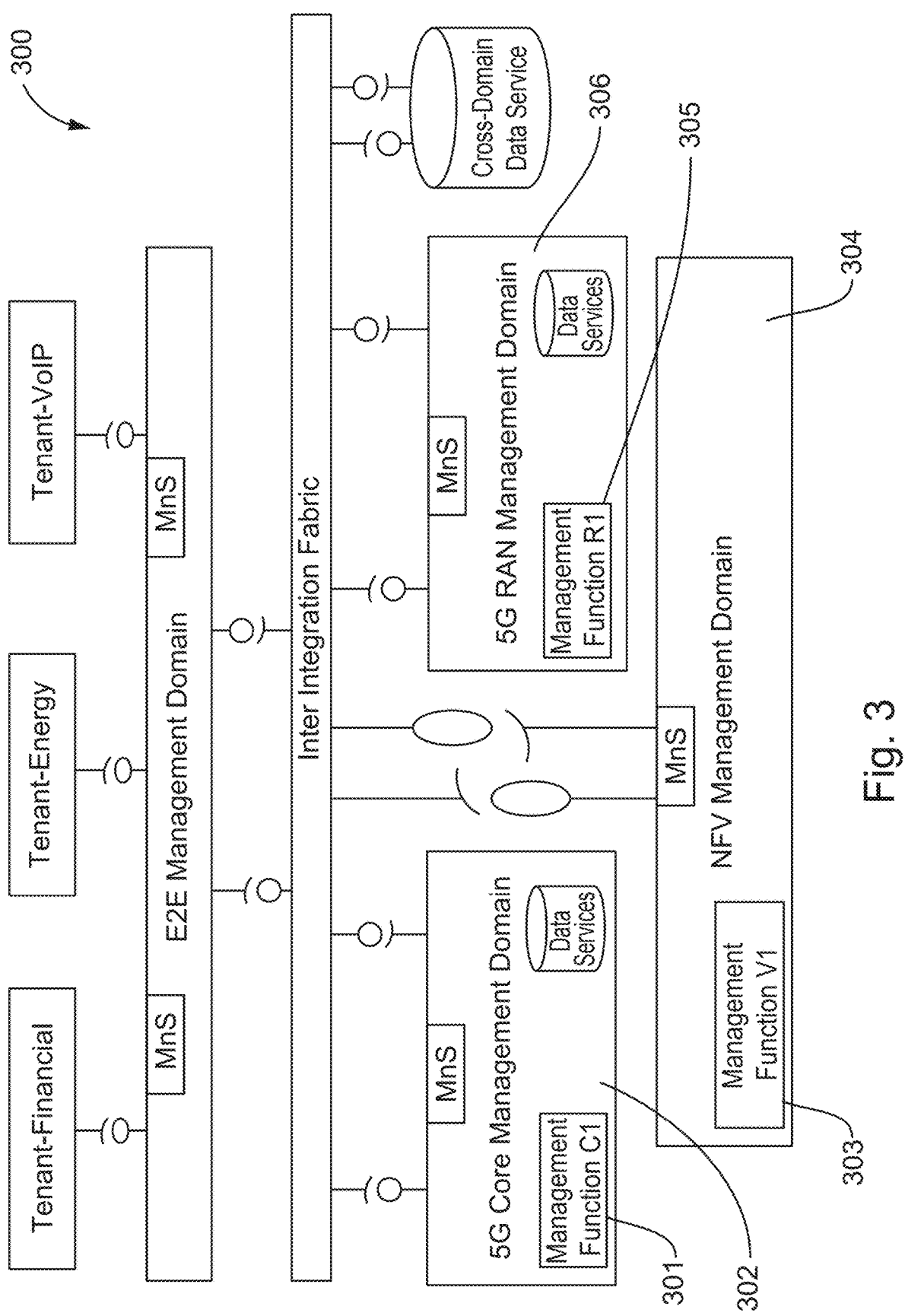
FIG. 3 illustrates an example zero-touch service and network management based multi-domains management system.

FIG. 3 shows as an example of the trust relationship 300 between Management Function (MnF) C1 301 in 5G Core Management Domain (MnD) 302 and MnF V1 303 in NFV MnD 304 in which a trust relationship between MnF R1 305 in 5G RAN MnD 306 and MnF V1 303 in NFV MnD 304 can be different because the trust capability and assurance of 5G Core MnD 302 and 5G RAN MnD 306 are different. In addition, the trust relationship between MnF C1 301 and MnF V1 303 can be changed from time to time as the change of MnFs (e.g. operational status and security postures of the MnF, package upgrade to support new features, scale to other region, etc.), its service consumers (e.g. new consumer from a new industry domain, such as webscale), and its service producers (e.g. compromising of a service producer, etc.) change. All the existing trust models mentioned above could not be used independently and statically to satisfy the basic security assurance requirement of the system.

Figure 4:
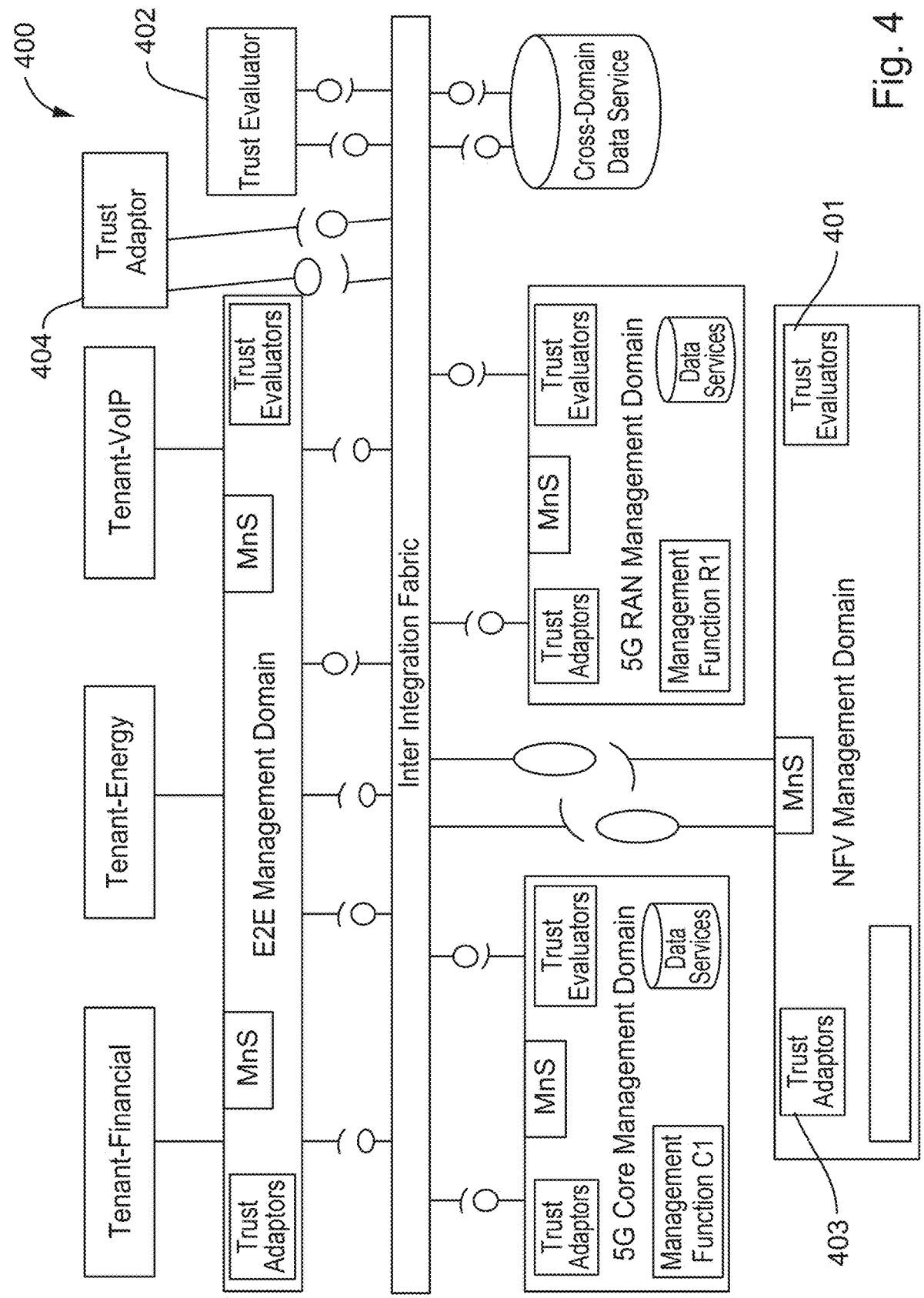
FIG. 4 illustrates an example block diagram of a model, according to an embodiment.

FIG. 4 illustrates an example block diagram of a model according to certain embodiments. As illustrated in FIG. 4, the example of certain embodiments introduce a Reflective and Adaptive mutual trust model 400 to adapt to the dynamics and diversity of 5G networking and the ZSM framework with centralized trust evaluator and distributed trust adapter.

The adaptive mutual trust model 400 may include a Common Knowledge based Trust Evaluator 402 that acts as an intelligent Function Block (FB) to evaluate trustworthiness of a cross domain entity based on Chain of Risk, Trust Profile, Trust Assurance, and other context data of the entity.

A Distributed Knowledge based Trust Evaluator 401 may acts as the adaptive mutual trust model's 400 intelligent FB to evaluate trustworthiness of an intra domain entity based on Chain of Risk, Trust Profile, Trust Assurance, and other context data of the entity. There could be one or more Trust Evaluators in a single domain.

A Common Knowledge based Trust Model Adapator 404 may act as the adaptive mutual trust model's 400 intelligent FB to create a trust relationship and a trust model between two inter-domain entities based on Composition of Trust from Trust Evaluator.

A Distributed Knowledge based Trust Model Adaptor 403 may act as the adaptive mutual trust model's 400 intelligent FB to create a trust relationship and a trust model between two inter/intra-domain entities based on Composition of Trust from Trust Evaluator. There could be one or more Trust Model Adapters in a single domain.

A Composition of Trust may be information evaluated by a trust evaluator according to analytics on Chain of Risk, Trust Profile, Trust Assurance, and other context data of an entity. An Entity may be a Service consumer or Service Producer or both.

Figure 5:
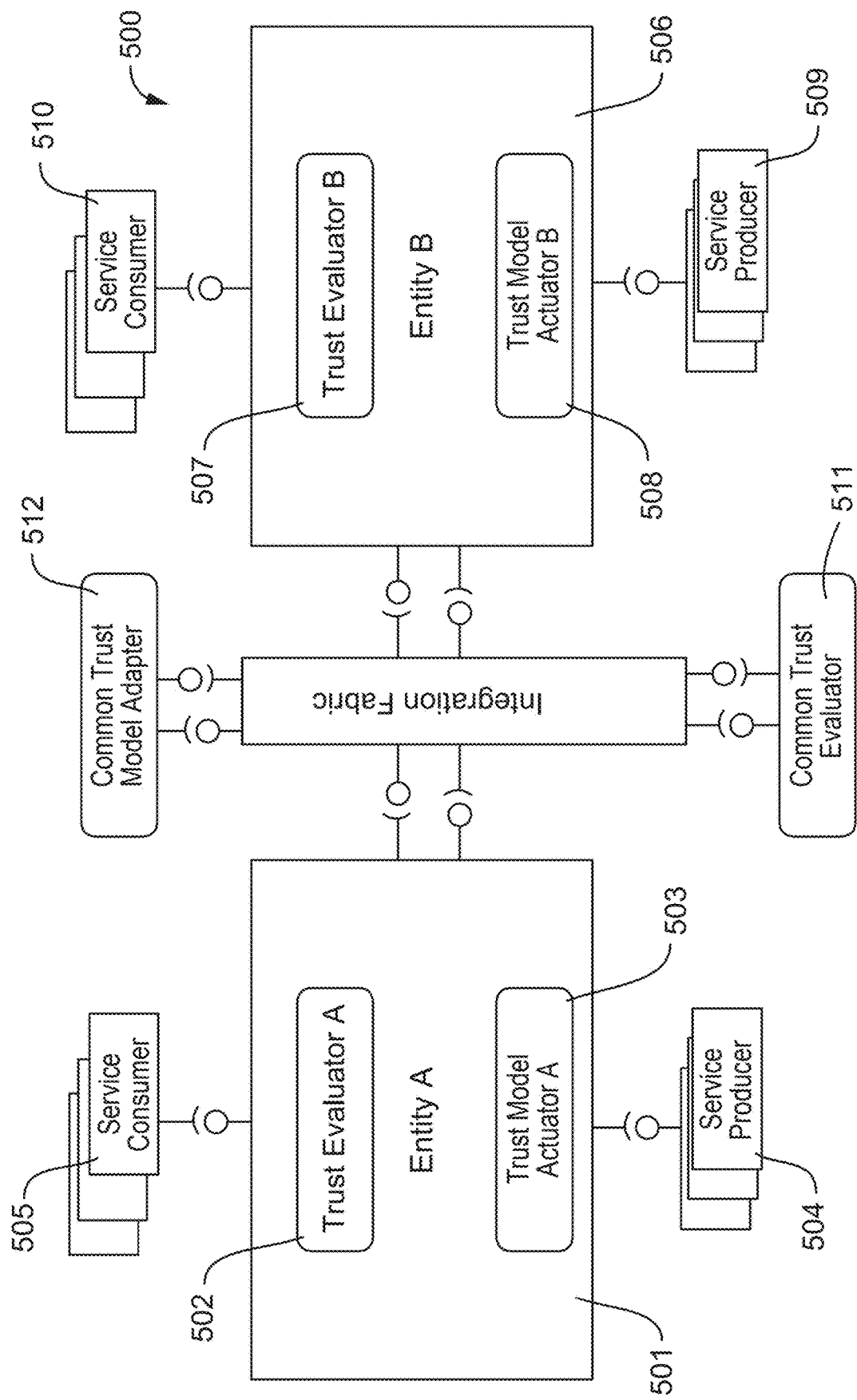
FIG. 5 illustrates an example block diagram of a model, according to an embodiment.

FIG. 5 illustrates an example of functional blocks for an adaptive trust model 500, according to an embodiment. Certain embodiments provide that Trust Evaluator A 502 or Trust Evaluator B 507 can be combined with Common Trust Evaluator 511; Trust Model Adaptor A 503 or Trust Model Adaptor B 508 can be combined with Common Trust Model Adaptor 512.

In certain embodiments, the workflow of an adaptive mutual trust model between diverse entities in dynamic 5G network and network management system may include Trust Model Adaptor A 503 of Entity A 501 creating an adaptive trust model to establish trust relationship with Entity B 506 according to Composition of Trust of Entity B 506 and Composition of Trust of Entity A 501.

Based on the Trust Model and related policies defined in the Trust Model, Entity A 501 may apply security controls between the apparatus and the other apparatus such as authenticate Entity B 506, may define access control rules for Entity B 506, may build secure channel with Entity B 506, and may record behaviors of Entity B 506 on Entity A 501.

Entity A 501 and Entity B 506 may be a service consumer, service producer, or both. The Trust Model created may be a validated/direct trust model, mediated/transitive trust model, mandated trust model, or hybrid trust model, etc.

Composition of Trust of Entity A 501 mentioned above may be derived by Trust Evaluator A 502 of Entity A 501 according to Chain of Risk, Trust Profile, Trust Assurance and other context data of Entity A 501.

Composition of Trust of Entity B 506 mentioned above may be either derived by Trust Evaluator of Entity A 501 according to Chain of Risk, Trust Profile, Trust Assurance and other context data of Entity B 506, or received from other trusted entities directly.

Chain of Risk mentioned above may be derived by a Trust Evaluator of an entity according to Trust Profile, Trust Assurance, and other context data of chain of service consumers and chain of service producers of the entity.

The Chain of Service Consumer discussed above may be a list of Service Consumers of an entity including direct consumers of the entity and consumers of its consumers. A Service Consumer can be Management Function, Network Function, Tenant, Operator, or any software or human entity.

Chain of Service Producer mentioned above may be a list of Service Producers of an entity including direct producer of the entity and producers of its producers. A Service Producer can be Management Function, Network Function, Operator, or any software or hardware.

A Trust profile mentioned above may define security characters (e.g. security threat and risk, applied countermeasure, security polices, regulations, etc.) and security capability (e.g. available security functions, etc.) of an entity. The Trust Profile can be changed according to upgrade, scaling of the entity, or adding/deleting/updating of services provided by the entity, adding/removing/changing of consumers or producers of the entity, security status and threat surface changing of the entity itself or its consumers or producers, the policy or regulation change on the entity, etc.

A Trust assurance may define capability and level of Security enforcement, verification, monitoring and compliance of an entity. Trust assurance can be dynamically changed based on change of the entity or change of its Trust profile, etc.

Similarly, Trust Model Adaptor B 508 of Entity B 506 may create adaptive trust model to establish trust relationship with Entity A 501 according to Trust Compositions of Entity B 506 and Entity A 501.

If there is change on Entity A 501, Trust Evaluator A 502 may derive a new Composition of Trust of Entity A 501 according to the change of the Entity A 501, and may inform Entity B 506 the change of the Entity A 501 directly or indirectly based on trust model between Entity A 501 and Entity B 506.

To reflect new Composition of Trust of Entity A 501, Trust Model Adapter A 503 may update/delete trust model and/or establish new trust relationship or delete the trust relationship with Entity B 506. Similarly, to reflect the change of Entity A 501, Trust Model Adaptor B 508 of Entity B 506 may update/delete trust model and/or establish new trust relationship or delete the trust relationship with Entity A 501.

The change of Entity A 501 mentioned above may include the entity upgrading, scaling, moving, security state change, adding/deleting consumer/producer of the entity of the entity, changing of security context of its consumers or producers, changing of threat surface related to the entity, changing of Security Policies or regulations related to the entity, etc.

The change of Entity A 501 received by Entity B 506 includes updated Composition of Trust of Entity A 501 or updated Chain of Risk, Trust Profile, Trust Assurance of Entity A 501 based on trust model between Entity A 501 and Entity B 506.

Based on the new Trust Model and related policies defined in the new Trust Model, Entity A 501 and Entity B 506 may apply security controls between the apparatus and the other apparatus such as authenticate the other Entity, define access control rules for the other Entity, build secure channel with the other Entity, and/or record behaviors of the other Entity.

In an example scenario, a trust relationship between Entity A 501 and Entity B 506 is established. As a precondition, the management system is a system with Service Based Management Architecture (SBMA) (e.g. ETSI ZSM framework-based system, 3GPP Rel15 defined network management system, etc.) or a network with Service Based Architecture (SBA) (e.g. 3GPP defined 5G Core), and before an entity is able to interact with another entity, mutual trust should be established between entities and the framework, as well as between the two entities to ensure confidentiality, integrity, availability and regulation compliance of both entities and the framework.

In this example, Entity A 501 consumes services produced by Entity B 506, and both Entity A 501 and Entity B 506 are deployed in an SBA/SBMA framework. Trustworthiness of framework entities (e.g. Common Trust Evaluator 511, Common Trust Model Adaptor 512) have been self-evaluated, and related Composition of Trust has been derived.

A unilateral trust relationship from Entity A 501 and Entity B 506 to framework entities has been established (e.g. based on a root of trust). In light of this assumption, Entity A 501 and Entity B 506 trust services and information produced by framework entities (e.g. Common Trust Evaluator 511, Common Trust Model Adaptor 512, etc.) based on established trust model, and Entity A 501 and Entity B 506 allow framework entities to consume their services based on established trust model.

Common Trust Evaluator 511 could retrieve trust related information of an entity in the framework from a trusted 3rd party entity, or from the entity itself after it builds related trust with the entity. In an embodiment, AI/ML technology could be used on Trust Evaluator and Trust Model adapter for knowledge based evaluation and adaptation.

In the example scenario, before providing any services to Entity A 501, Common Trust Evaluator 511 of the framework evaluates the trustworthy of the Entity A 501 according to Chain of Risk, Trust Profile, Trust Assurance and other context data of Entity A 501 from a trusted entity, and derives Composition of Trust of Entity A 501. The trusted entity may be a third party entity or Entity A 501 itself. The third party entity can be hardware, software, or human, etc.

Based on Composition of Trust of Common Trust Evaluator 511 and Composition of Trust of Entity A 501, Common Trust Model Adaptor 512 creates relevant Trust Model to establish unilateral trust relationship from Common Trust Evaluator to Entity A 501. Similarly, Common Trust Model Adaptor 512 creates relevant Trust Model to establish unilateral trust relationship from Common Trust Evaluator 511 to Entity B 506.

Before consuming any services produced by Entity B 506, Trust Evaluator A 502 for Entity A 501 checks the trustworthiness of Entity B 506 with Common Trust Evaluator 511. Based on mutual trust model between Entity A 501 and Common Trust Evaluator 511, as well as mutual trust model between Entity B 506 and Common Trust Evaluator 511, Common Trust Evaluator 511 either returns Composition of Trust of Entity B 506 to Entity A 501 or returns Chain of Risk, Trust Profile, Trust Assurance and other context data of Entity B 506 to Entity A 501. In some cases, Common Trust Evaluator 511 may return an error to Entity A 501.

If Common Trust Evaluator 511 returns Chain of Risk, Trust Profile, Trust Assurance and other context data of Entity B 506 to Entity A 501, Trust Evaluator A 502 evaluates the trustworthiness of Entity B 506 according to Chain of Risk, Trust Profile, Trust Assurance, and other context data of Entity B 506, and derives Composition of Trust of Entity B 506.

Trust Evaluator A 502 self-evaluates the trustworthiness of Entity A according to Chain of Risk, Trust Profile, Trust Assurance and other context data of Entity A 501, and derives Composition of Trust of Entity A 501. Based on the Composition of Trust of Entity B 506 and the Composition of Trust of Entity A 501, Trust Model Adaptor A 503 creates a relevant Trust Model (e.g. validated/direct trust, mediated/transitive trust, mandated trust, etc.) to establish unilateral trust relationship from Entity A 501 to Entity B 506.

Based on the Trust Model and related policies defined in the Trust Model, Entity A 501 applies security controls between the apparatus and the other apparatus such as Entity A 501 authenticates Entity B 506 and builds a secure channel with Entity B 506 to access services of Entity B 506.

Before providing any services to Entity A 501, Trust Evaluator B 507 for Entity B 506 checks the trustworthiness of Entity A 501 with Common Trust Evaluator 511.

Based on the mutual trust model between Entity B 506 and Common Trust Evaluator 511, as well as mutual trust model between Entity A 501 and Common Trust Evaluator 511, Common Trust Evaluator 511 either returns Composition of Trust of Entity A 501 to Entity B 506 or returns Chain of Risk, Trust Profile, Trust Assurance and other context data of Entity A 501 to Entity B 506. In some cases, Common Trust Evaluator 511 may return an error to Entity B 506.

If Common Trust Evaluator 511 returns Chain of Risk, Trust Profile, Trust Assurance and other context data of Entity A 501 to Entity B 506, Trust Evaluator B 507 evaluates the trustworthiness of Entity A 501 according to Chain of Risk, Trust Profile, Trust Assurance and other context data of Entity A, and derives Composition of Trust of Entity A 501.

Trust Evaluator B 507 self-evaluates the trustworthiness of Entity B 506 according to Chain of Risk, Trust Profile, Trust Assurance and other context data of Entity B 506, and derives Composition of Trust of Entity B 506.

Based on Composition of Trust of Entity B 506 and Composition of Trust of Entity A 501, Trust Model Adaptor B 508 creates a relevant Trust Model (e.g. validated/direct trust, mediated/transitive trust, mandated trust, etc.) to establish a unilateral trust relationship from Entity B 506 to Entity A 501.

Based on the Trust Model and related policies defined in the Trust Model, Entity B 506 applies security controls between the apparatus and the other apparatus such as Entity B 506 authenticates Entity A 501, defines access control rules for Entity A 501 and builds a secure channel with Entity A 501 to provide services to Entity A 501, and record behaviors of Entity A 501 on Entity B 506.

In another example scenario, the trust relationship between Entity A 501 and Entity B 506 is changed according to dynamic change of Entity A 501, Entity B 506, or their producers 504, 509 or consumers 505, 510.

As a precondition to this example, the mutual trust between Entity A 501 and Common Evaluator 511 was already established with specific trust models, the mutual trust between Entity B 506 and Common Evaluator 511 was already established with specific trust models, and the mutual trust between Entity A 501 and Entity B 506 was already established with specific trust models.

In an embodiment, the trust relationship and related trust models between entities may be changed dynamically based on change of the entities. The change of an entity may include one or more of a change of entity itself (e.g. the entity is upgrade, introduces new feature, a new service, or uses a new technology, software, or hardware, etc.), the entity may be scaled or moved, especially to new geolocation, security state of the entity may change (e.g. the entity was compromised or damaged, etc.), change of context of the entity (e.g. Add/delete consumer/producer of the entity, add consumer of specific industry domain), the security context of its consumers or producers may change (e.g. security policy changes of its consumer), the threat surface related to the entity is changed (e.g. there may be a new vulnerability exposed, or new attack mode disclosed, etc.), and/or the security policies or regulations related to the entity may change.

In the example scenario, according to certain embodiments, when there is change on Entity A 501, Trust Evaluator A 502 re-evaluates the trustworthiness of Entity A 501 according to updated Chain of Risk, Trust Profile, Trust Assurance and other context data of Entity A 501, and derives new Composition of Trust of Entity A 501.

Based on trust relationship between Entity A 501 and Common Trust Evaluator 511, Trust Evaluator A 511 may sync the change of Entity A 511 with Common Trust Evaluator 511, and based on trust relationship between Common Trust Evaluator 511 and Entity A 501, and trust relationship between Common Trust Evaluator 511 and Entity B 506, Common Trust Evaluator 511 may further sync the change of Entity A 501 to Entity B 506.

Based on trust relationship between Entity A 501 and Entity B 506, Trust Evaluator A 502 may sync the change of Entity A 501 with Entity B 506 directly.

The sync information can be the updated Composition of Trust of Entity A 501, or the updated Chain of Risk, Trust Profile, Trust Assurance and other context data of Entity A 501, etc.

To reflect the new Composition of Trust of Entity A 501, Trust Model Adapter A 503 may update trust models (e.g. validated/direct trust, mediated/transitive trust, mandated trust, etc.) for new trust relationships to Common Trust Evaluator 511 and/or Entity B 506. Based on the new Trust Model and related policies defined in the new Trust Model, Entity A 501 applies security controls between the apparatus and the other apparatus such as Entity A 501 authenticates Entity B 506 and builds a secure channel with Entity B 506 to access services of Entity B 506.

If Entity B 506 received Chain of Risk, Trust Profile and Trust Assurance of Entity A 501 from either Common Trust Evaluator 511 or Entity A 501, Trust Evaluator B 507 re-evaluates the trustworthiness of Entity A 501 according to the updated Chain of Risk, Trust Profile, and Trust Assurance of Entity A 501, and derives new Composition of Trust of Entity A 501. Based on the new Composition of Trust of Entity A 501, Trust Model Adaptor B 508 may update the Trust Model (e.g. validated/direct trust, mediated/transitive trust, mandated trust, etc.) for the new trust relationship from Entity B 506 to Entity A 501.

Based on the new Trust Model and related policies defined in the new Trust Model, Entity B 506 apply security controls between the apparatus and the other apparatus such as Entity B 506 authenticates Entity A 501, defines access control rules for Entity A 501, builds a secure channel with Entity A 501 to provide services to Entity A 501, and records behaviors of Entity A 501 on Entity B 506.

Figure 6:
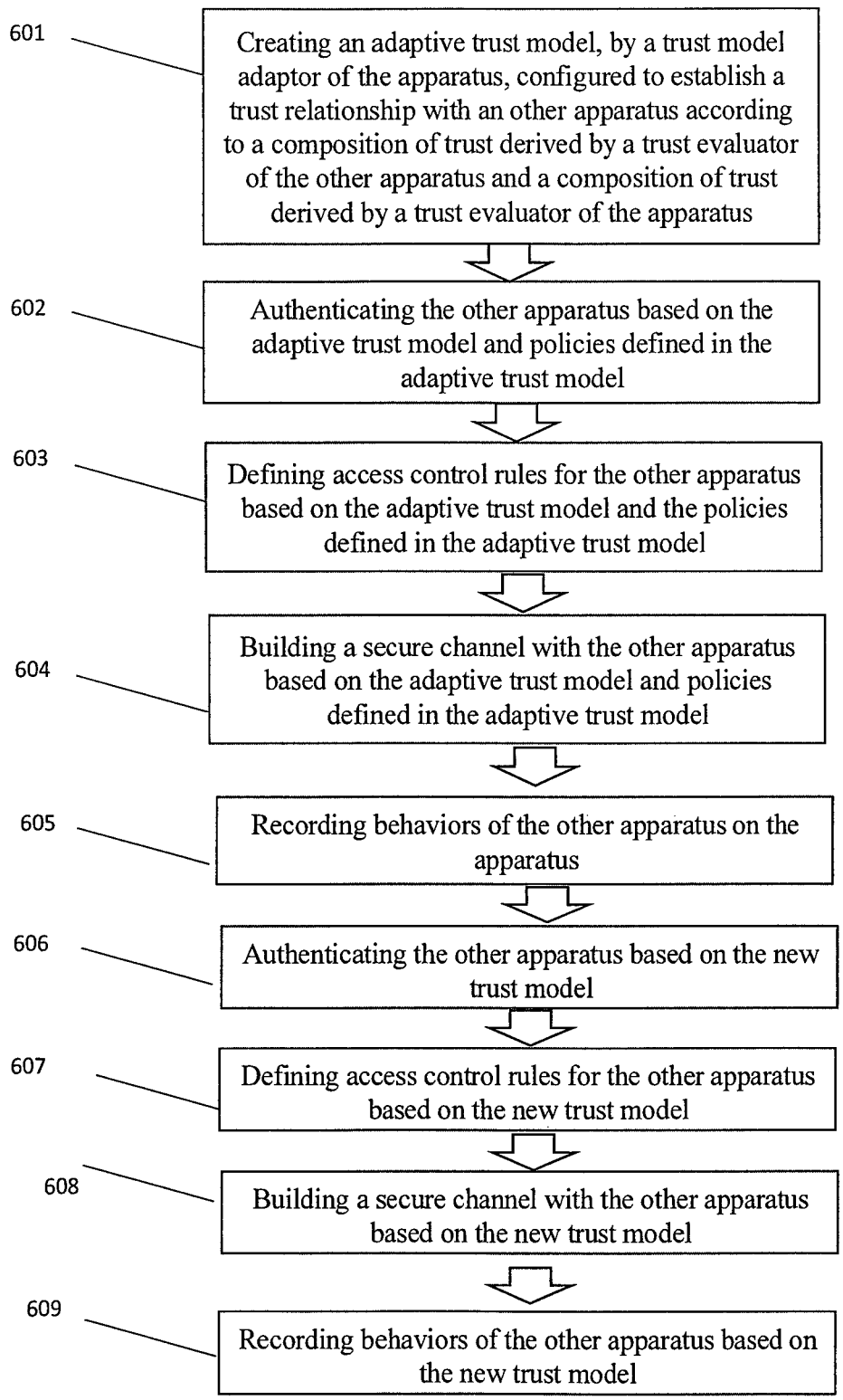
FIG. 6 illustrates an example flow diagram of a method, according to an embodiment.

FIG. 6 illustrates an example flow diagram of for implementing an adaptive mutual trust model for dynamic and diversity multi-domain networks, according to an embodiment.

As illustrated in the example of FIG. 6, the method may include at 601 creating an adaptive trust model, by a trust model adaptor of an apparatus, configured to establish a trust relationship with an other apparatus according to a composition of trust derived by a trust evaluator of the other apparatus and a composition of trust derived by a trust evaluator of the apparatus. The method may also include authenticating the other apparatus based on the adaptive trust model and policies defined in the adaptive trust model at 602, and at 603, the method may include defining access control rules for the other apparatus based on the adaptive trust model and the policies defined in the adaptive trust model.

In an embodiment, at 604 the method may include building a secure channel with the other apparatus based on the adaptive trust model and policies defined in the adaptive trust model, and at 605 recording behaviors of the other apparatus on the apparatus. The method, as shown at 606 may also include authenticating the other apparatus based on the new trust model, at 607 defining access control rules for the other apparatus based on the new trust model, at 608 building a secure channel with the other apparatus based on the new trust model, and at 609 recording behaviors of the other apparatus based on the new trust model.

Figure 7A:
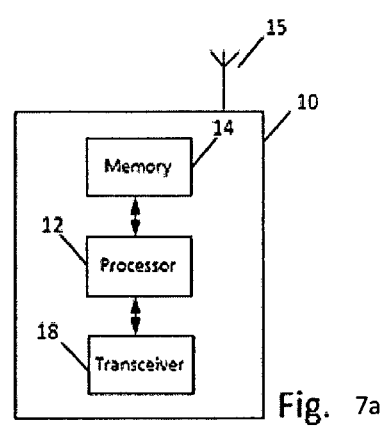
FIG. 7*a* illustrates an example block diagram of an apparatus, according to an embodiment.

FIG. 7a illustrates an example of an apparatus 10 according to an embodiment. In an embodiment, apparatus 10 may be a node, host, or server in a communications network, a network/service management system or serving such a network. For example, apparatus 10 may be a communication service management function, network slice management function, network slice subnet management function, network function management function, base station, a Node B, an evolved Node B (eNB), 5G Node B or access point, next generation Node B (NG-NB or gNB), CU of a gNB, WLAN access point, Access and Mobility Management Function (AMF), Session Management Function (SMF), User Plane Function (UPF), Authentication Server Function (AUSF), Network Repository Function (NRF), Network Slice Selection Function (NSSF), a data management entity (e.g., UDM), or other entity associated with a radio access network, such as 5G or NR. In one example, apparatus 10 may represent a management service producer.

As illustrated in the example of FIG. 7a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, management and orchestration, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiving circuitry. In some example embodiments, apparatus 10 may include or be coupled to one or more antennas 15.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or entity, such as a management service producer, or the like. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as FIG. 6.

Figure 7B:
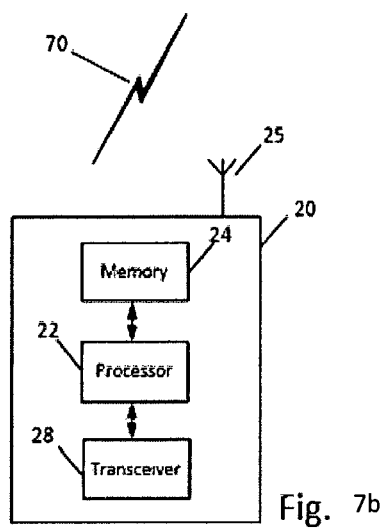
FIG. 7*b* illustrates an example block diagram of an apparatus, according to an embodiment.

FIG. 7b illustrates an example of an apparatus 20 according to an example embodiment. In example embodiments, apparatus 20 may be a node or server associated with a radio access network, a network/service management system, such as a LTE network, 5G or NR or other radio systems which might benefit from an equivalent procedure. For example, apparatus 20 may be a communicant service management function, network slice management function, network slice subnet management function, network function management function, base station, a Node B, an evolved Node B (eNB), 5G Node B or access point, next generation Node B (NG-NB or gNB), Access & Mobility Management Function (AMF), Session Management Function (SMF), User Plane Function (UPF), Authentication Server Function (AUSF), Network Repository Function (NRF), Network Slice Selection Fucntion (NSSF), and/or DU or CU of a gNB associated with a radio access network, such as 5G or NR. In one example, apparatus 20 may represent a client, such as a management service consumer, a network function, a network element or a management function.

It should be understood that, in some example embodiments, apparatus 20 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 20 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface.

The DU may be a logical node that includes a subset of the gNB functions, depending on the functional split option. It should be noted that one of ordinary skill in the art would understand that apparatus 20 may include components or features not shown in FIG. 7b.

As illustrated in the example of FIG. 7b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7b, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an example embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In example embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25.

In an example embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some example embodiments, processor 22 and memory 24 may be included in or may form a part of processing circuitry or control circuitry. In addition, in some example embodiments, transceiver 28 may be included in or may form a part of transceiving circuitry.

As introduced above, in certain embodiments, apparatus 20 may be a network node or entity, such as a management service producer, or the like. According to certain embodiments, apparatus 20 may be controlled by memory 24 and processor 22 to perform the functions associated with any of the embodiments described herein. For example, in some embodiments, apparatus 20 may be configured to perform one or more of the processes depicted in any of the flow charts or signaling diagrams described herein, such as FIG. 6.

In some example embodiments, the functionality of any of the methods, processes, diagrams, or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Therefore, certain example embodiments provide several technological improvements, enhancements, and/or advantages over existing technological processes and constitute an improvement at least to the technological field of wireless network control and management. For example, according to certain embodiments, the trust model is able to adapt for dynamic and/or multi-domain networks. Accordingly, the use of certain example embodiments results in improved functioning of communications networks and their nodes, such as base stations, eNBs, gNBs, and/or UEs or mobile stations.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

What is claimed is:

1. An apparatus, comprising:
   at least one processor; and
   at least one memory comprising computer program code,
   the at least one memory and computer program code configured, with the at least one processor, to cause the apparatus at least to
   create an adaptive trust model, by a trust model adaptor of the apparatus, configured to establish a trust relationship with an other apparatus according to
      a composition of trust derived by a trust evaluator of the other apparatus based on context data related the other apparatus excluding any context data related to the apparatus, and
      a composition of trust derived by a trust evaluator of the apparatus based on context data related to the apparatus excluding any context data related to the other apparatus; and
   apply security controls between the apparatus and the other apparatus.

2. The apparatus according to claim 1, wherein, either the apparatus or the other apparatus comprises a service consumer and/or a service producer.

3. The apparatus according to claim 1, wherein the adaptive trust model comprises at least one of the following: a validated/direct trust model, a mediated/transitive trust model, a mandated trust model, and/or a hybrid trust model.

4. The apparatus according to claim 1, wherein the composition of trust of the apparatus is derived according to at least one of a chain of risk of the apparatus, a trust profile of the apparatus, a trust assurance of the apparatus, and context data of the apparatus.

5. The apparatus according to claim 1, wherein the composition of trust of the other apparatus is one of:
   derived according to at least one of a chain of risk of the other apparatus, a trust profile of the other apparatus, trust assurance of the other apparatus, and context data of the other apparatus; or
   received from other trusted entities.

6. The apparatus according to claim 1, wherein a chain of risk of each respective apparatus is derived by the trust evaluator of each respective apparatus according to a trust profile of each respective apparatus, a trust assurance of each respective apparatus, a chain of service consumers context data of each respective apparatus, and a chain of service producers context data of each respective apparatus.

7. The apparatus according to claim 1, wherein a chain of service consumer of each respective apparatus comprises a list of service consumers of each respective apparatus and consumers of the service consumers of each respective apparatus.

8. The apparatus according to claim 1, wherein a chain of service producer of each respective apparatus comprises a list of service producers of each respective apparatus and producers of the service producer of each respective apparatus.

9. The apparatus according to claim 1, wherein a trust profile of each respective apparatus defines security characters of each respective apparatus and security capability of each respective apparatus, wherein each trust profile is configured to change according to at least one of the following: an upgrade, scaling of each respective apparatus, or changing of services provided by each respective apparatus, changing of service consumers of each respective apparatus, changing of the service producers of each respective apparatus, a security status, and a threat surface changing of each respective apparatus, changing policy/regulation on each respective apparatus.

10. A method, comprising:
   creating an adaptive trust model, by a trust model adaptor of an apparatus, configured to establish a trust relationship with an other apparatus according to
      a composition of trust derived by a trust evaluator of the other apparatus based on context data related the other apparatus excluding any context data related to the apparatus, and
      a composition of trust derived by a trust evaluator of the apparatus based on context data related to the apparatus excluding any context data excluding any context data related to the other apparatus; and
   applying security controls between the apparatus and the other apparatus.

11. The method according to claim 10, wherein either the apparatus or the other apparatus comprises a service consumer and/or a service producer.

12. The method according to claim 10, wherein the adaptive trust model comprises at least one of the following: a validated/direct trust model, a mediated/transitive trust model, a mandated trust model, and/or a hybrid trust model.

13. The method according to claim 10, wherein the composition of trust of the apparatus is derived according to at least one of a chain of risk of the apparatus, a trust profile of the apparatus, a trust assurance of the apparatus, and context data of the apparatus.

14. The method according to claim 10, wherein the composition of trust of the other apparatus is one of:
   derived according to at least one of a chain of risk of the other apparatus, a trust profile of the other apparatus, trust assurance of the other apparatus, and context data of the other apparatus; or
   received from other trusted entities.

15. The method according to claim 10, wherein a chain of risk of each respective apparatus is derived by the trust evaluator of each respective apparatus according to a trust profile of each respective apparatus, a trust assurance of each respective apparatus, a chain of service consumers context data of each respective apparatus, and a chain of service producers context data of each respective apparatus.

16. The method according to claim 10, wherein a chain of service consumer of each respective apparatus comprises a list of service consumers of each respective apparatus and consumers of the service consumers of each respective apparatus.

17. The method according to claim 10, wherein a chain of service producer of each respective apparatus comprises a list of service producers of each respective apparatus and producers of the service producer of each respective apparatus.

18. The method according to claim 10, wherein a trust profile of each respective apparatus defines security characters of each respective apparatus and security capability of each respective apparatus, wherein each trust profile is configured to change according to at least one of the following: an upgrade, scaling of each respective apparatus, or changing of services provided by each respective apparatus, changing of service consumers of each respective apparatus, changing of the service producers of each respective apparatus, a security status, and a threat surface changing of each respective apparatus, changing policy/regulation on each respective apparatus.

19. The method according to claim 10, wherein a trust assurance of each respective apparatus defines capability of security enforcement, level of security enforcement, verification of each respective apparatus, monitoring of each respective apparatus, and compliance of each respective apparatus, and each trust assurance is configured to dynamically change based on change of each respective apparatus or change of the trust profile of each respective apparatus.

20. A non-transitory computer readable medium encoded with instructions that, when executed in hardware, perform a process, the process comprising:
    creating an adaptive trust model, by a trust model adaptor of an apparatus, configured to establish a trust relationship with an other apparatus according to
        a composition of trust of the other apparatus based on context data related the other apparatus excluding any context data related to the apparatus, and
        a composition of trust of the apparatus based on context data related to the apparatus excluding any context data related to the other apparatus; and
    applying security controls between the apparatus and the other apparatus.

* * * * *